United States Patent
Emord

(10) Patent No.: US 6,876,945 B2
(45) Date of Patent: Apr. 5, 2005

(54) SEAMLESS SENSORY SYSTEM

(76) Inventor: Nicholas Jon Emord, 7 Taurasi Rd., Hingham, MA (US) 02043

(*) Notice: Subject to any disclaimer, the term of this patent is extended or adjusted under 35 U.S.C. 154(b) by 0 days.

(21) Appl. No.: 10/396,979

(22) Filed: Mar. 25, 2003

(65) Prior Publication Data
US 2003/0182077 A1 Sep. 25, 2003

Related U.S. Application Data
(60) Provisional application No. 60/367,230, filed on Mar. 25, 2002.

(51) Int. Cl.[7] .......................... G01C 17/00; G01C 17/38
(52) U.S. Cl. ............................ 702/150; 702/94; 702/95
(58) Field of Search ........................... 702/150, 93, 94, 702/95, 115, 116, 142

(56) References Cited

U.S. PATENT DOCUMENTS

| | | | | |
|---|---|---|---|---|
| 4,170,892 A | * | 10/1979 | Bailitis ........................ 73/23.2 |
| 4,343,182 A | * | 8/1982 | Pompei ........................ 374/31 |
| 4,942,765 A | * | 7/1990 | Hiniker et al. ................ 73/431 |
| 5,191,646 A | * | 3/1993 | Naito et al. .................. 345/853 |
| 5,245,347 A | * | 9/1993 | Bonta et al. ................. 342/149 |
| 5,597,534 A | * | 1/1997 | Kaiser .................... 422/82.02 |
| 6,050,283 A | * | 4/2000 | Hoffman et al. ................ 137/3 |
| 6,139,323 A | * | 10/2000 | Christians et al. ............ 434/16 |
| 6,167,347 A | * | 12/2000 | Lin ............................. 701/214 |
| 6,362,773 B1 | * | 3/2002 | Pochmuller .................. 342/52 |
| 6,415,223 B1 | * | 7/2002 | Lin et al. ..................... 701/208 |
| 6,546,267 B1 | * | 4/2003 | Sugiura et al. ............. 600/310 |
| 6,625,997 B1 | * | 9/2003 | Schultz ........................ 62/186 |

* cited by examiner

Primary Examiner—Michael Nghiem
Assistant Examiner—Meagan S Walling
(74) Attorney, Agent, or Firm—Charles J. Prescott

(57) ABSTRACT

The Seamless Sensory System (3S), the invention, integrates state-of-the-art sensor technology with modern software engineering practices to create seamless positioning. The invention can include the incorporation of GPS/Inertial Navigation/IR and other technologies into a handheld/man wearable/mounted system that will not be compromised in hostile environments. The invention continues accurate navigation in the absence of GPS satellite signals. The invention utilizes a "continuous calibration" Kalman Filter methodology and motion sensor(s) to maintain "GPS-like" accuracy after GPS signals are no longer available. A proprietary technology called an Ultrasonic Doppler Velocity Measurement (UVM) Sensor is the invention's 'key component' to create "GPS like performance" under any GPS denied condition. Additional sensors are included to complete the picture of the local environment.

6 Claims, 3 Drawing Sheets

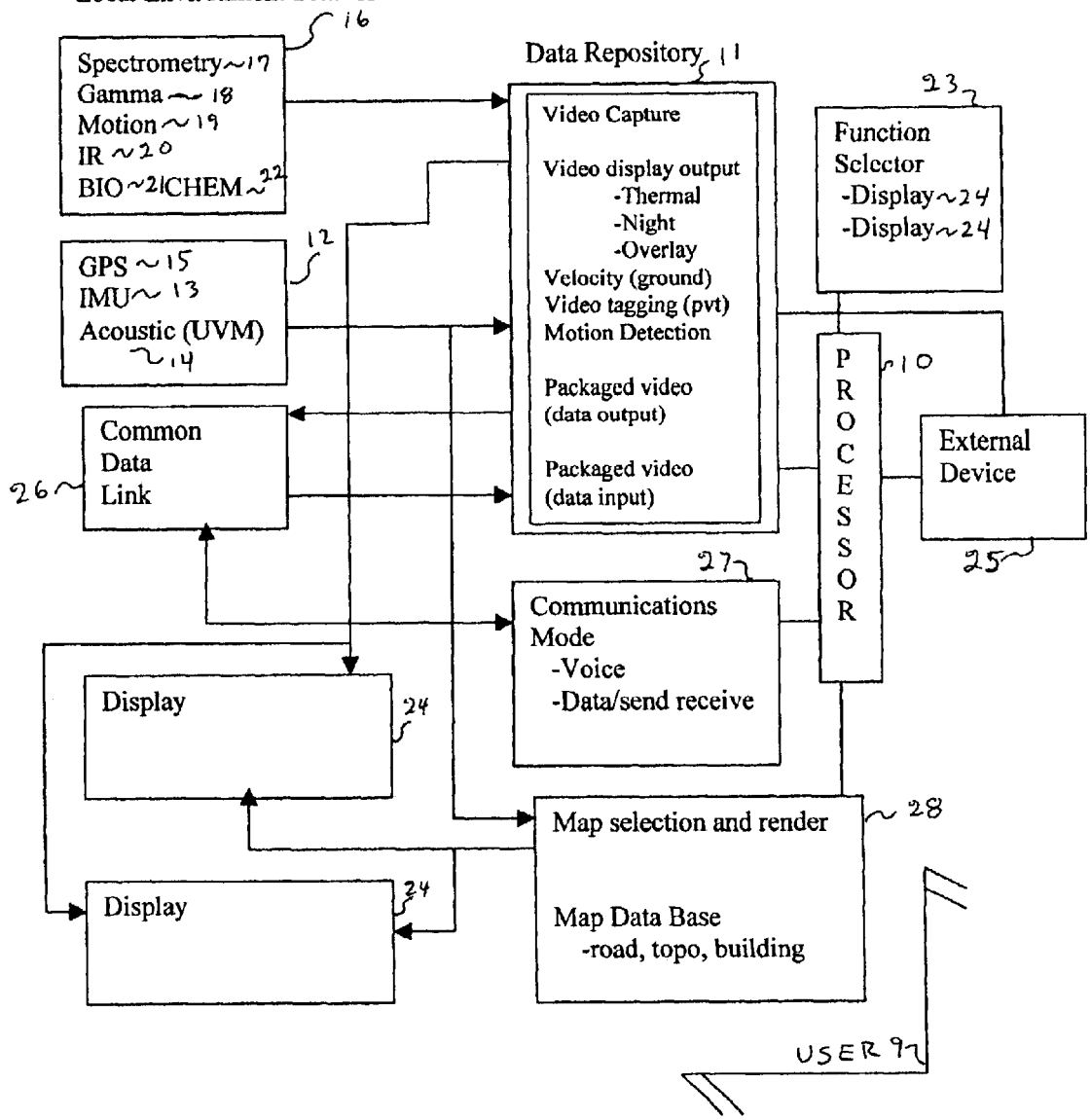
FIG. 1 Seamless Sensor System (3S) Block Diagram

FIG. 2 The User
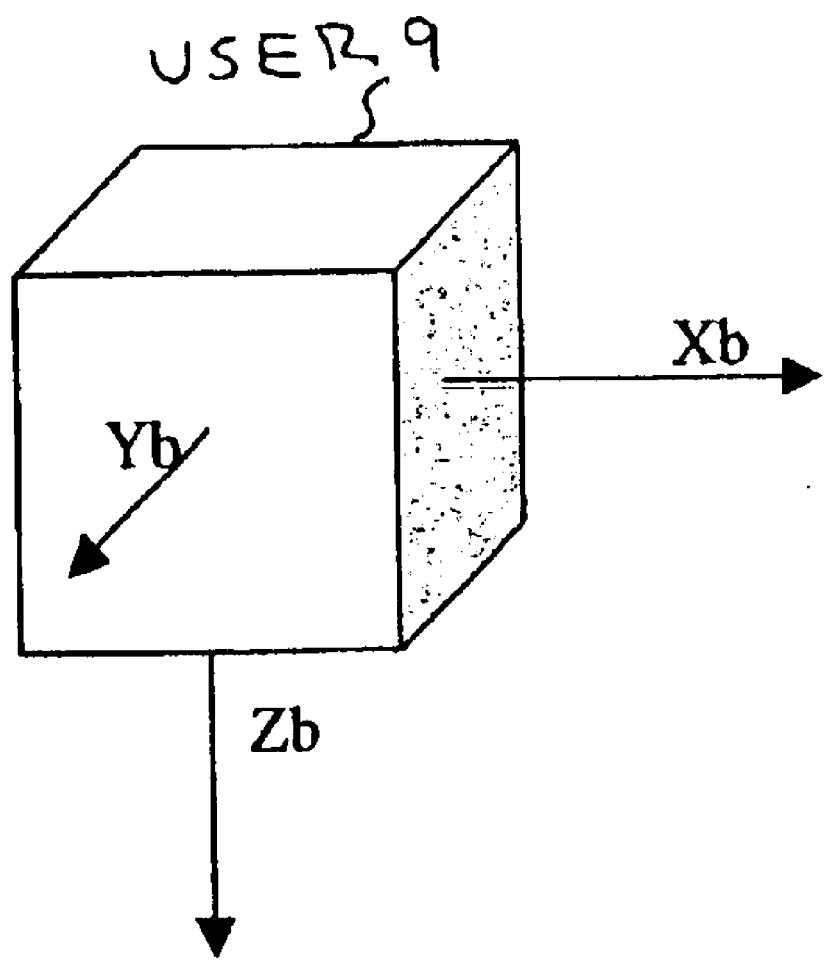

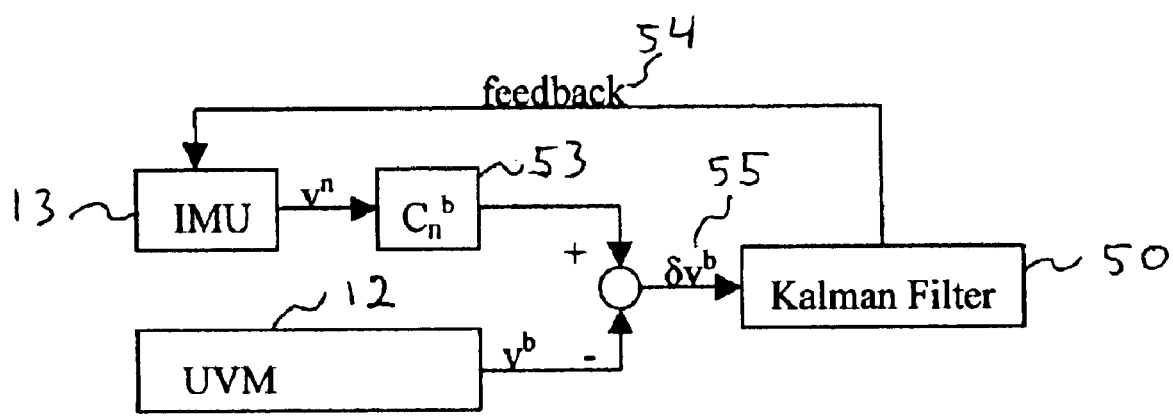
FIG. 3. IMU/UVM/Kalman Filter diagram

SEAMLESS SENSORY SYSTEM

RELATED APPLICATIONS

This application is based on U.S. Provisional Patent Application No. 60/367,230, filed on Mar. 25, 2002, the contents of which are incorporated herein their entirety by reference.

BACKGROUND OF THE INVENTION

Over the past several years, sensor technology has evolved in an isolated manner, with individual components becoming smaller, less costly to build, more sophisticated and specialized. This has led to a proliferation of singular devices that perform exceptionally well at their individual purpose. It is clear that the next wave of development will be in the integration of components into systems or sensor suites, which far transcend the capability and intent of the individual components.

The concept behind the Seamless Sensory System (3S) is to integrate those components and technologies that, in essence, complete the picture beyond the individual contributions. The word, Seamless, is carefully chosen. It is intended to indicate the complementary nature of the underlying sensors. Seamless in its capabilities, through such natural transitions as, outdoor to indoor, day to night, cold to warm; Seamless in its capabilities through changes in surrounding conditions such as transmission denial and human sensory deprivation.

The Seamless Sensory System (3S) core technology is created by a data fusion of an Ultrasonic Doppler Velocity Measurement (UVM) sensor and Inertial Measurement Unit (IMU). The result is a comprehensive and seamless data set of positioning information, independent of the users surroundings. Position is determined in the open, in cities, in buildings, subterranean locations and in overhead vegetation cover/canopy.

The methodology of the invention is based on non-traditional strap down navigation technology. The recent introduction of Commercial of the Shelf (COTS) low cost, low power, small size Inertial Measurement Unit (IMU) products afford the consideration of a combined IMU/UVM technology. While the integration of GPS/IMU has been accomplished as seen in U.S. Pat. No. 6,522,266 the prior state of the art lacks the essential precision velocity 'motion' measurement of the navigator. The integration of a comprehensive UVM/IMU overcomes the drawbacks of previous inventions.

The invention's design is that of a small lightweight, affordable product. The accuracy of such a system is made possible based on innovations arising from research and development of a unique integration of IMU/UVM initialized with GPS. The results show that integration of small size high accuracy GPS technology and low cost, low power, and small size Micro Electro Mechanical System (MEMS)/Fiber Optic Gyros (FOG) IMU or equivalent, and Ultrasonic Velocity Measurement (UVM) technology provides accurate positioning. While an IMU is incorporated to the invention, the use of new and yet to be created inertial technology is a "plug and play" component to the invention.

The Ultrasonic Doppler Velocity Measurement (UVM) Sensor is an essential component to the invention's ability to enable "GPS like performance" under any environment, including GPS DENIED CONDITIONS. This component of the invention uses ultrasonic Doppler signals to determine precise 'motion' velocity information of the user.

The invention provides position information in areas devoid of traditional GPS signal coverage. The invention can use its GPS/IMU integration in concert with static updating techniques during loss of GPS signal. This is done by the use of Zero Velocity (ZUPT) and Fixed Coordinate Calibration. This methodology takes full advantage of attributes germane to personal navigation. Key to leveraging the benefit of human dynamics is the location of the 'motion' sensor(s) at a select location relative to the human body, which affords the lowest dynamics of motion during normal human locomotion.

In addition the dynamics of human locomotion naturally support the static and near static updating techniques implemented by the invention. When combat or other conditions suppress the luxury of performing these updates, the invention further utilizes the Ultrasonic Doppler Velocity Measurement (UVM) Sensor to continue positioning performance in battlefield and other GPS denied conditions.

SUMMARY OF THE INVENTION

The Seamless Sensory System (3S), the invention, provides the user with continuous positioning and reconnaissance capabilities for users requiring an extended data collection capability for their application. Its architecture is an integration of commercial off the shelf technologies (COTS). As handheld/man wearable/mountable system, the invention can display maps of urban areas, indoor "blue print" layout of buildings, and topographic, surface and subsurface maps in outdoor areas. The end user's location and surroundings are obtainable on a display.

Beyond Visual Spectrum (BVS) capability of the invention is accomplished by the invention's inclusion of thermal/Infrared, Spectrometry, Gamma and motion detection sensors (of entities external to the invention) as well as chemical and biological sensors. The invention's capability to send and receive communications, voice and data: visual information, for day and night time conditions: and sensory information, in the form of thermal detection/motion detection, provides a comprehensive suite of data to depict the users environmental conditions.

The functionality of the invention is to collect and combine the raw data from the inventions sensors. With this, the invention has the capability to aid target mensuration and identification in GPS denied areas. The invention supports real-time presentation of the field personnel's geodetic position and environmental conditions, as well as data collection, correlation and real-time transmission to external devices, or other entity.

The following describes each subsystem of the invention, which includes Navigation, Sensors, Communications, Mapping and Display.

Navigation is supported by a data fusion of one or more sensors that can include Ultrasonic Doppler Velocity Measurement (UVM), Inertial Measurement Unit (IMU), GPS, Baro-altimeter, acoustic sensors, etc. The result is a comprehensive and seamless data set of positioning information, independent of the users surroundings. Position is determined in the open, in cities, in buildings, subterranean locations and in overhead vegetation cover/canopy. The invention, on demand or at set intervals, can communicate this information. The invention supports position time tagged data for maps and video information.

An array of Sensors can be integrated to support Beyond Visual Spectrum (BVS) detection. Thermal and Night vision sensors can be incorporated by the invention. Thermal images are presented to the user on a display. These images can also be communicated on demand or at set intervals. Spectral and Gamma imagery is supported with the integration of each sensor suited to perform its task with the invention. Object movement detection is determined by the invention's use of acoustic sensors. All images are archived in a common image file format by the invention. Chemical and Biological sensor data is archived as sampled data items integrated to the data set by the invention.

Communications can be supported by a cellular voice and data package, and common data link or other communications means by the invention. Information can be transmitted to a Tactical System with the invention's interface to external equipment. Additionally the invention can send and/or receive voice information in real-time. Such data can include text, video capture of one or more of a number of sensor video images at the invention's location, as well as maps, diagrams, or documents. This information can be uploaded/downloaded to the invention via cellular or common data link or other equipment.

Maps of outdoor areas, topographic and coastal; urban and rural areas, of street and highways; and buildings, in "blueprint" form can be used by the invention. Automatic Display of maps is rendered based on the invention's present position.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principals of the invention.

FIG. 1 is a functional block diagram, of the Seamless Sensory Suite (3S), illustrating one embodiment of the invention.

FIG. 2 The User diagram, represents the orthogonal motion of the user as one embodiment of the invention.

FIG. 3. IMU/UVM/Kalman Filter diagram, represents the integration of motion sensor(s) and Kalman filter as one embodiment of the invention.

DETAILED DESCRIPTION OF PREFERRED EMBODIMENTS OF THE INVENTION

FIG. 1 contains a schematic functional block diagram illustrating the architecture and functional process of one embodiment of a system in accordance with the invention. In this embodiment the User 9, which can be a human, a vehicle, a weapon or munitions, is attached to the invention. The processor 10 is used to receive signals from a data repository 11. The data repository 11 receives real-time signals from a suite of sensors 12. The suite of sensors 12 individually measure parameters related to velocity and acceleration. The Inertial Measurement Unit (IMU) 13, measures rotational velocities and linear accelerations of the user. The IMU 13 generates a signal and provides the signal to the data repository 11. The Ultrasonic Doppler Velocity Measurement (UVM) 14 sensor measures linear velocities of the user. The acoustic sensor 14 generates a signal and provides the signal to the data repository 11.

In one embodiment of the system, a collection of local environment sensors 16 measures and outputs signals to the data repository 11. A spectrometer 17 sensor, a radiation 18 sensor, a motion 19 sensor, an infrared 20 sensor, a biological 21 sensor, and a chemical 22 sensor will make measurements and output a signal or signals to the data repository 11. The data repository 11 will collect signals from all sensors and format/time tag the signals for use by the processor 10.

In one embodiment of the system, the function selector 23 will direct signals to either a display(s)24, or an external device 25, which is conducted by the processor 10 and the data repository 11. The processor 10 and data repository 11, will also direct signals to a common data link so that formatted signals can be made available to a Communications Mode 27 device to transmit and receive signals. The processor 10 will conduct the Map selection and render 28 device to use signals made available by the data repository 11 for display and creation of maps.

A processor 10 determines the parameter related to position in accordance with the invention. In one embodiment the processor receives signals from the data repository to compute latitude, longitude, altitude, heading and speed of the user.

The following describes the means which the processor 10 develops the parameter of position. Described are the sensing of linear motion by Ultrasonic means, along with sensing inertial motion with an IMU and incorporating the sensed motion with a Kalman filter.

Linear measurement and inertial measurement of the invention, commenced from a measured or relative position, is processed to produce positioning information. In one embodiment the invention incorporates UVM measurements to a Kalman filter in concert with IMU data to provide the necessary information to resolve position.

With regard to linear measurement of motion, the drawback of the existing invention was the incorporation of Microwave Doppler technology. Specific drawbacks to existing invention include the emission of RF that "exposes" a user to detection, the requirement a relatively large physical array, and significant source power requirements.

The Ultrasonic Doppler Velocity (UVM) technology of the invention, overcomes the drawbacks of prior art by requiring comparatively small physical size, operating virtually undetected, and requiring very low power.

The following describes the "methodology" of Ultrasonic Doppler Measurement (for the case of a single directional velocity measurement). It is intended to provide an explanation to those experienced in the art as to the invention's use of this technology.

In one embodiment, a signal generated by an oscillator of the UVM, is transmitted to the ground surface in an inclined direction from the user. Then, the signal is reflected and detected by the receiver of the UVM. The Doppler effect causes the frequency shift, which can be used to derive the velocity of the user.

In one embodiment of the invention the user 9, represented in FIG. 2, user 9, can be an individual carrying the invention, or the invention collocated with any piece of equipment such as a backpack, weapon, vehicle, or munitions.

In one embodiment the Doppler measurement is used to correct navigation errors of an IMU in a similar way to GPS derived velocities. The benefit it to aid the IMU during GPS signal deprivation, also called GPS Denied conditions. Additionally the use of Doppler measurement extends or eliminates the time interval between performing a Zero Velocity Update (ZUPT) and or Fixed Position Updates.

In one embodiment the Inertial Measurement Unit (IMU) sensor and Ultrasonic Velocity Measurement (UVM) sensor is aligned relative to each other.

In one embodiment the offset of the UVM from the ground or other surface can range from 0.4–2 meter or greater based on the application.

While GPS Doppler measurements can yield navigation frame velocities, the Ultrasonic Velocity sensors can detect forward or backward velocities, i.e., the user 9 frame (directional) velocities. Consequently, they do not contribute much in estimating the attitude errors.

In one embodiment of the invention as presented in FIG. 3, measurements are incorporated in the implementation of a Kalman filter 50. The Ultrasonic Doppler Velocity Measurement (UVM), 12 sensor measures forward/backward velocity. The direction cosine matrix is multiplied to yield the navigation frame velocity. Then, the difference between the speed sensor output and the INS, 13 velocity is passed to the Kalman filter 50. The forward/backward direction velocity error measurement, 55 equation in the Kalman filter, 50 can be described as:

$$[\delta v_x^b]_k = \begin{bmatrix} 0 & 0 & 0 \end{bmatrix} \begin{vmatrix} c_{11} & c_{21} & c_{31} \end{vmatrix} \begin{vmatrix} v_D c_{21} & -v_D c_{11} & v_E c_{11} \\ -v_E c_{31} & +v_N c_{31} & -v_N c_{21} \end{vmatrix}_k x_k + v_k$$

where $c_{ij}$'s, $1 \leq i,j \leq 3$, are the (i,j)-th elements of the direction cosine matrix $C_b^n$, 53. Finally, the estimated errors are fed back, 54 to the IMU, 13. This is the same situation as that of an odometer. The only difference is that a differentiator is required to get velocity from an odometer.

The sensors of the invention incorporated as described herein improve the IMU 13 accuracy significantly. The Seamless Sensory System incorporating the sensors of motion, being the IMU, 13 and Doppler Velocity Measurement (UVM), 12 sensor with the Kalman Filter, 50 provide the necessary technology to determine position determination.

What is claimed is:

1. A user-worn or equipment mounted seamless positioning sensory system, comprising:
    a computer processor;
    a data repository operably connected to said processor to collect and seamlessly transfer real time data received into said data repository relative to geodetic position signals, velocity signals, acceleration signals and local Beyond Visual Spectrum (BVS) signals;
    a suite of sensors connected to said data repository including a GPS receiver, an inertial measurement unit (IMU) and an acoustic ultrasonic Doppler measurement unit (UVM);
    said GPS receiver providing accurate geodetic positioning signals, when available, to the data repository;
    said IMU providing rotational velocity and linear acceleration signals to said data repository and said UVM providing true orthogonally compensated linear forward and backward velocity signals to the data repository which combine and are processed for enhanced accuracy through a Kalman filter of said system to provide GPS-like geodetic positioning signals when in a GPS denied local environment;
    an array of environment sensors providing BVS signals to said data repository including thermal imaging signals, spectral and gamma imagery signals, radiation signals, infrared signals, chemical and biological signals;
    a communications module connected to said data repository by a common data link providing voice and data transmission to and from a remote location;
    a map database connected to said data repository, said processor and said display unit for observation on said display unit of stored outdoor areas;
    a display unit for selective display of a map in said map database and signals received into said data repository;
    said system being attachable to a lower torso area of a user or to external equipment to minimize extraneous dynamics of motion of said system whereby accuracy of said system is enhanced.

2. A user-worn or equipment mounted seamless positioning sensory system as set forth in claim 1 comprising:
    a user-activated Zero Velocity Update (ZUPT) signal indicating to said Kalman filter that said system currently is substantially stationary and not experiencing any change in rotational velocity or in acceleration;
    a user-activated Fixed Position Update signal providing to said Kalman filter a current accurate geodetic position including latitude, longitude and altitude of said system.

3. A user-worn or equipment mounted seamless positioning sensory system, comprising:
    a computer processor;
    a data repository operably connected to said processor to collect and seamlessly transfer real time data received into said data repository relative to geodetic position signals, velocity signals, acceleration signals and local Beyond Visual Spectrum (BVS) signals;
    a suite of sensors connected to said data repository including a GPS receiver, an inertial measurement unit (IMU) and a substantially non-detectable acoustic ultrasonic Doppler measurement unit (UVM);
    said GPS receiver providing accurate geodetic positioning signals, when available, to the data repository;
    said IMU providing rotational velocity and linear acceleration signals to said data repository and said UVM providing net orthogonal linear forward and backward velocity signals to the data repository which combine and are processed for enhanced accuracy through a Kalman filter of said system to provide GPS-like geodetic positioning signals when in a GPS denied local environment;
    an array of environment sensors providing BVS signals to said data repository including thermal imaging signals, spectral and gamma imagery signals, radiation signals, infrared signals, chemical and biological signals;
    a communications module connected to said data repository by a common data link providing voice and data transmission to and from a remote location;
    a map database connected to said data repository, said processor and said display unit for observation on said display unit of stored outdoor areas;
    a display unit for selective display of maps in said map database and signals stored in said data repository;
    said system being attachable to a lower torso area of a user or to external equipment to minimize extraneous dynamics of motion of said system.

4. A user-worn or equipment mounted seamless positioning sensory system as set forth in claim 3, comprising:
    a user-activated Zero Velocity Update (ZUPT) signal indicating to said Kalman filter that said system currently is substantially stationary and not experiencing any change in rotational velocity or in acceleration;
    a user-activated Fixed Position Update signal providing to said Kalman filter a current accurate geodetic position including latitude, longitude and altitude of said system.

5. A non-hand carryable user-worn or equipment mounted seamless positioning sensory system, comprising:

a computer processor;

a data repository operably connected to said processor to collect and seamlessly transfer real time data received into said data repository relative to geodetic position signals, velocity signals and acceleration signals;

a suite of sensors connected to said data repository including a GPS receiver, an inertial measurement unit (IMU) and an acoustic ultrasonic Doppler measurement unit (UVM);

said GPS receiver providing accurate geodetic positioning signals, when available, to the data repository;

said IMU providing rotational velocity and linear acceleration signals to said data repository and said UVM providing compensated orthogonal frame of reference linear forward and backward velocity signals to the data repository which combine and are processed for enhanced accuracy through a Kalman filter arrangement of said system to provide GPS-like geodetic positioning signals when in a GPS denied local environment;

a communications module connected to said data repository by a common data link providing voice and data transmission to and from a remote location;

a map database connected to said data repository, said processor and said display unit for observation on said display unit of stored outdoor areas;

a display unit for selective display of signals and information stored in said data repository;

said system being attachable to a lower torso area of a user or to external equipment to minimize extraneous dynamics of motion of said system;

a user-activated Zero Velocity Update (ZUPT) signal indicating to said Kalman filter that said system currently is substantially stationary and not experiencing any change in rotational velocity or in acceleration;

a user-activated Fixed Position Update signal indicating to said Kalman filter a current accurate position including latitude, longitude and attitude of said system.

6. A user-worn or equipment mounted seamless positioning sensory system, comprising:

a computer processor;

a data repository operably connected to said processor to collect and seamlessly transfer real time data received into said data repository relative to geodetic position signals, velocity signals, acceleration signals and local Beyond Visual Spectrum (BVS) signals;

a suite of sensors connected to said data repository including a GPS receiver, an inertial measurement unit (IMU) and an acoustic ultrasonic Doppler measurement unit (UVM);

said GPS receiver providing accurate geodetic positioning signals, when available, to the data repository;

said IMU providing rotational velocity and linear acceleration signals to said data repository and said UVM providing true orthogonally compensated linear forward and backward velocity signals to the data repository which combine and are processed for enhanced accuracy through a Kalman filter of said system to provide GPS-like geodetic positioning signals when in a GPS denied local environment;

an array of environment sensors providing BVS signals to said data repository including a thermal imaging sensor, a spectral sensor, a gamma imagery sensor, a radiation sensor, an infrared sensor, a chemical sensor, a biological sensor, and a video sensor;

a communications module connected to said data repository by a common data link providing voice and data transmission to and from a remote location;

a map database connected to said data repository, said processor and said display unit for observation on said display unit of stored outdoor areas;

a display unit for selective display of a map in said map database and signals received into said data repository;

said system being attachable to a lower torso area of a user or to external equipment to minimize extraneous dynamics of motion of said system whereby accuracy of said system is enhanced;

a user-activated Zero Velocity Update (ZUPT) signal indicating to said Kalman filter that said system currently is substantially stationary and not experiencing any change in rotational velocity or in acceleration;

a user-activated Fixed Position Update signal providing to said Kalman filter a current accurate geodetic position including latitude, longitude and altitude of said system.

* * * * *